United States Patent Office 2,927,035
Patented Mar. 1, 1960

2,927,035

COLORED SHAPED STRUCTURES FROM VISCOSE AND PROCESS FOR THEIR MANUFACTURE

Jacques Wegmann and Carl Becker, Basel, Switzerland, assignors to Ciba Limited, Basel, Switzerland No Drawing. Application March 20, 1958
Serial No. 722,657

Claims priority, application Switzerland March 26, 1957

6 Claims. (Cl. 106—165)

It is known that colored structures, especially fibers and foils of viscose, can be produced by adding a finely dispersed colored pigment to the spinning solution. A considerable difficulty in using pigments is that the pigment must be extremely finely dispersed in the viscose in order to permit of satisfactory spinning and uniform coloring of the spun material. If the degree of dispersion of the pigment in the viscose is not sufficiently fine changes in the tint of the product may occur during the spinning process, because when the viscose is filtered a part of the pigment is held back immediately preceding the spinning jet. Moreover, it may be necessary to change the filter rather frequently, and it is often difficult to obtain transparent colorations with pigments, especially when the concentration of the coloring matter is high. Consequently this process cannot be used for dyeing foils, where transparency is required. Attempts have been made to overcome the aforesaid difficulties by coloring the spinning solution with a water-soluble dyestuff. However, during the subsequent precipitation and washing process a large part of the dyestuff is washed out.

The present invention provides a process for the production from viscose (i.e. from cellulose xanthate) of colored structures which are fast to light and are transparent even when the concentration of the dyestuff is high. In the process of this invention there is added to the spinning solution an organic dyestuff or dyestuff-former, which is soluble in an alkaline medium or can be dissolved with the aid of a reducing agent such as sodium hydrosulfite, and which contains at least one reactive group capable of entering into chemical combination with free hydroxyl groups present in the cellulose xanthate molecule, the spinning solution so treated is then shaped, and the structure so formed, when it contains a dyestuff-former, treated with a compound yielding a dyestuff with the dyestuff-former.

As organic dyestuffs, dyestuffs of a very wide variety of classes can be used in the process of this invention, for example, stilbene dyestuffs, azine dyestuffs, dioxazine dyestuffs, phthalocyanine dyestuffs, perinone dyestuffs, peri-dicarboxylic acid imide dyestuffs, nitro-dyestuffs, diphenylmethane dyestuffs, and above all acid anthraquinone dyestuffs and acid azo-dyestuffs, including metal-free and metallizable or metalliferous monoazo- or poly-azo-dyestuffs, which contain a grouping or a substituent capable of reacting with polyhydroxylated materials. Among such groups or substituents there may be mentioned, for example, the ethylene-imide group, epoxy groups, the vinyl group in a vinyl-sulfone group or in the acrylic acid radical, and above all those labile substituents which split off easily with the taking up of the electron pair of the bond.

As labile substituents, which split off with the taking up with the electron pair of the bond, there may be mentioned, for example, aliphatically bound phosphoric or sulfuric acid ester groups, sulfonic acid fluoride groups and above all aliphatically bound sulfonyloxy groups and halogen atoms, especially an aliphatically bound chlorine atom. These labile substituents are advantageously in the γ- or β-position of an aliphatic radical which is bound to the dyestuff molecule directly or through an amino, sulfone or sulfonic acid amide group. In the case of those dyestuffs which contain halogen atoms as labile substituents, these exchangeable halogen atoms may be present in an aliphatic acyl group, for example, in the β-position of a propionyl group, or in a heterocyclic ring. Dyestuffs containing the exchangeable halogen atoms in a heterocyclic ring may contain a monohalogenated heterocyclic ring, for example, a monochlorinated 1:3:5-triazine radical, such as the radical of the formula (1)

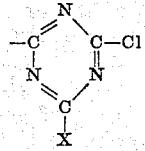

in which X represents a substituted or unsubstituted amino group or a substituted hydroxyl group, or they may contain a dichlorotriazine radical. Especially good results are obtained with soluble dyestuffs of this kind which have no affinity or no pronounced affinity for cotton.

A large number of dyestuffs of the above kind are known or can be made by methods in themselves known, for example, from dyestuff components which already contain the aforesaid labile substituents or radicals containing the labile substituents by methods in themselves known in the dyestuff molecule after production of the dyestuff. Thus, valuable condensation products, which contain an exchangeable chlorine atom and are suitable for dyeing by the process of this invention, are obtained by reacting an azo-dyestuff or anthraquinone dyestuff which contains a reactive hydroxyl, mercapto or especially a free amino group, for example, with chloracetyl chloride or with β-bromo- or β-chloropropionyl chloride or chloropropionic anhydride or cyanuric chloride or with a primary condensation product of cyanuric chloride which contains two chlorine atoms and in which the third chlorine atom of the cyanuric chloride has been exchanged for an organic radical. The dyestuffs to be used in this process which contain a sulfonylated hydroxyl group may be prepared, for example, by reacting one molecular proportion of a dyestuff containing a hydroxyalkyl group, for example, a sulfonic acid-n-hydroxyalkyl amide group or a β-hydroxyalkyl-sulfone group with at least one molecular proportion of an organic sulfonic acid halide, for example para-toluene sulfonic acid chloride, benzene sulfonyl chloride or ethane sulfonyl chloride, or with concentrated sulfuric acid or chlorosulfonic acid, under conditions such that the hydroxyl group is acylated.

As organic dyestuff-formers, which may be used in the process of this invention, there may be mentioned more especially coupling components which contain a reactive group as defined above, especially derivatives of α- or β-naphthol, for example, derivatives of 2-amino-5-hydroxynaphthalene-7-sulfonic acid, or of 2-amino-8-hydroxynaphthalene-6-sulfonic acid or arylides of 2:3-hydroxynaphthoic acid. There may also be mentioned coupling components containing enolizable groups, for example, acetoacetic acid anilides or phenyl-methyl-pyrazolones. There are also suitable as dyestuff-formers in the present process aromatic amines of the kind used as diazo-components, provided that they contain reactive substituents and groups imparting solubility in water, for example, derivatives of 1:4- and especially 1:3-diaminobenzene sulfonic acid or of 4:4'-diaminodiphenyl sulfonic acids.

The aforesaid dyestuffs are advantageously added to the cellulose xanthate solution in the form of an aqueous solution of the dyestuff or they may be stirred directly into the xanthate solution. In order that the reaction of the reactive groups with the cellulose molecules shall take place as completely as possible, it is of advantage to allow the solution to stand for a long time, for example, for about 20–60 hours at room temperature, or to warm the solution. In many cases it is of advantage to prepare a concentrated cellulose xanthate stock solution containing up to 10% of the dyestuff calculated on the cellulose content, and to incorporate the stock solution with the viscose to be dried.

The shaping is carried out by extruding the colored cellulose xanthate solution into an acid precipitating bath by one of the usual methods.

The after-treatment of the structures so obtained is also carried out by the customary methods by washing with warm water, and, if desired, with a warm aqueous solution of an alkali sulfite or alkali sulfide to accelerate desulfuring, following by rinsing and scrooping by treatment with a wetting agent, advantageously sodium oleate, at a raised temperature.

When a dyestuff-former is added to the cellulose xanthate solution, the dyestuff must be developed on the structure that is produced. When a coupling component is used as dyestuff-former, development of the dyestuff is carried out by after-treating the shaped structure with a solution of a diazotized amine. When the structure contains a diazotizable amine, the structure is introduced into an aqueous solution of nitrous acid in order to diazotise the amino group, and then coupling with a coupling component is carried out in a separate bath.

The dyeings so obtained are usually distinguished by their high brilliance, transparency and especially by their fastness to washing and rubbing.

The following examples illustrate the invention, the parts and percentages being by weight:

*Example 1*

1 part of the compound of the formula

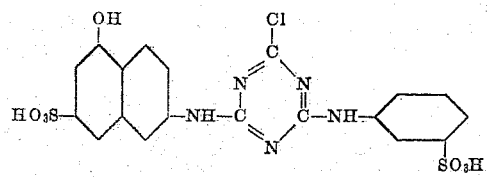

is dissolved in 50 parts of water, and the solution is stirred into 1175 parts of a viscose solution of 8.5% strength and having a content of 100 parts of α-cellulose. The mixture is stirred for ½ hour and then allowed to stand for 60 hours at room temperature.

The viscose composition is then extruded through spinning jets in the usual manner to produce viscose filaments, and the filaments are coagulated in a precipitating bath containing, per liter, 120 grams of sulfuric acid of 96% strength, 270 grams of sodium sulfate and 10 grams of zinc sulfate and having a temperature of 45° C.

The resulting filaments are stretched to the extent of 25% and collected in a spinning can rotating at 6000 revolutions per minute.

The spinning cake so obtained is then after-treated in a closed apparatus with circulating liquors, first by being rinsed for 10 minutes with water at 60–70° C., then desulfured for 20 minutes with a solution containing 5 grams of sodium sulfite per liter at 70° C., then rinsed again and finally scrooped for 10 minutes at 50° C. with a solution containing 50 grams of sodium oleate per liter. The spinning cake is then dewatered and dried.

Instead of carrying out the desulfuring in the manner described above, there may be used an aqueous solution containing, per liter, 5 grams of sodium hydroxide and 1 gram of sodium sulfide and carrying out the treatment for 20 minutes at 55° C., whereby a similarly good result is obtained.

The spinning cake is then treated for 10 minutes in a cold solution of 1% strength of a diazo-compound of 2:5-dichloraniline stabilized with zinc chloride, rinsed, scrooped for 10 minutes at 50° C. in a sodium oleate solution of 5% strength, dewatered and dried.

There is obtained a good orange dyeing which is fast to washing and rubbing, and has an excellent transparency.

The same result can be obtained by omitting the intermediate drying of the spinning cake, and after-treating it in the above diazo-solution immediately following the desulfuring and rinsing treatments.

By using for the after-treatment a weakly alkaline solution of 1% strength of a diazo compound of 4-benzoylamino-2-methoxy-3-methyl-aniline stabilized with zinc chloride, a fast brilliant red dyeing is likewise obtained.

By using a cold solution of 1% strength of the stabilized diazo-compound of 5-amino-2-benzoylamino-1:4-diethoxybenzene, the pH value of which solution has been adjusted to 8 with ammonia and sodium bicarbonate, a brilliant violet dyeing is obtained.

By using, instead the compound of the above formula, 1 part of the compound of the formula

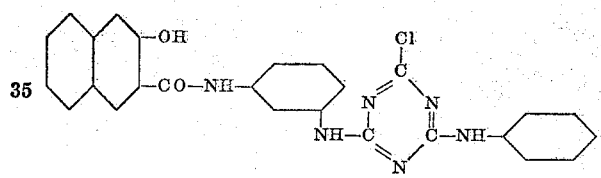

dissolved in 50 parts of sodium hydroxide solution of 2% strength, and otherwise proceeding in the manner described above, there is obtained, by the treatment in the diazo-solution first mentioned above, a red-violet dyeing having similarly excellent properties of fastness.

*Example 2*

1 part of the compound of the formula

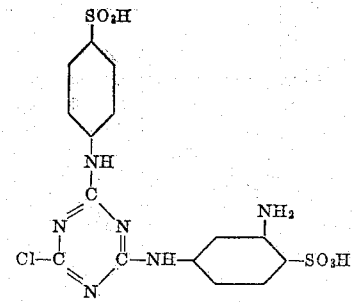

is dissolved in 50 parts of water and incorporated in viscose filaments in the manner described in Example 1.

The viscose spinning cake, after being desulfured and rinsed, is treated for 15 minutes in a cold solution containing per liter, 1 gram of sodium nitrite and 3 cc. of concentrated hydrochloric acid, rinsed and developed for 10 minutes in a solution of 1% strength of 1-benzoylamino-8-hydroxynaphthalene-3:6-disulfonic acid, which contains 1% of sodium acetate. The spinning cake is then rinsed, scrooped for 10 minutes at 50° C. in a sodium oleate solution of 5% strength, dewatered and dried.

There is obtained a brilliant pink dyeing of excellent transparency, which is fast to light and rubbing.

Example 3

2 parts of the dyestuff of the formula

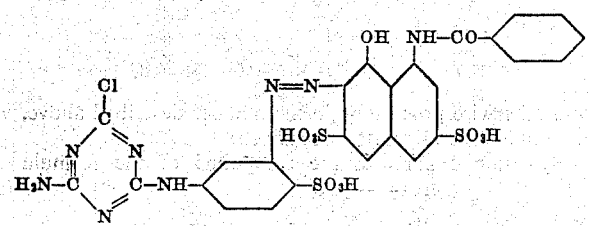

are dissolved in 50 parts of water and the solution is stirred into 1175 parts of a viscose solution of 8.5% strength.

The mixture is stirred for ½ hour, allowed to stand for 60 hours at room temperature, then heated to 60° C., allowed to cool, and spun into filaments as described in Example 1. There is obtained a transparent viscose yarn of a strong red color which is fast to washing and rubbing.

By using, instead of the aforesaid dyestuff, 2 parts of the dyestuff of the formula

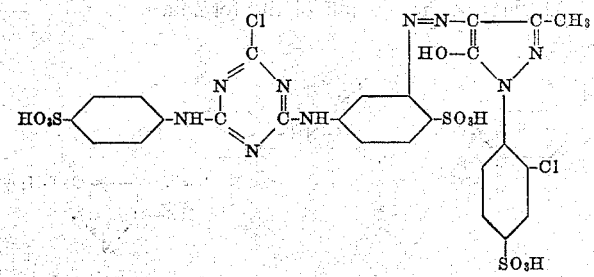

and otherwise proceeding in the manner described above there is obtained a strong yellow dyeing which is likewise of excellent transparency and has good properties of fastness.

By extruding the composition through a slit, instead of a spinning nozzle, and finishing the shaped product in the manner described above, there is obtained a completely transparent regenerated cellulose film, which is colored fast red or yellow, respectively.

Example 4

1 part of the dyestuff of the formula

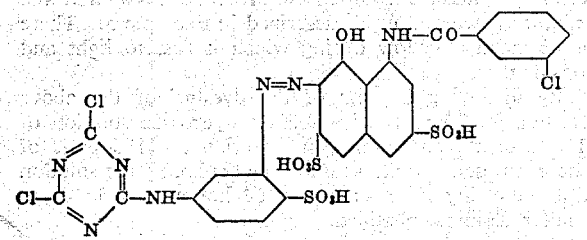

is dissolved in 50 parts of water at 50° C. and the solution is introduced into 1175 parts of a cellulose xanthate solution of 8.5% strength.

The mixture is spun and finished in the manner described in Example 1, and a viscose yarn is obtained that is dyed a brilliant pink of excellent fastness to washing and rubbing.

By using, instead of the aforesaid dyestuff, 2 parts of the dyestuff of the formula

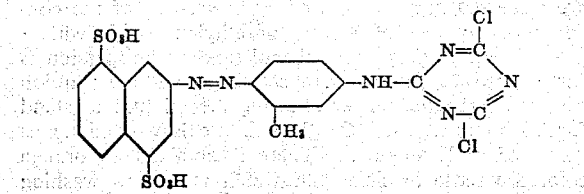

and otherwise proceeding in the manner described above, there is obtained a transparent yellow dyeing which is fast to washing and rubbing.

Example 5

1 part of the dyestuff of the formula

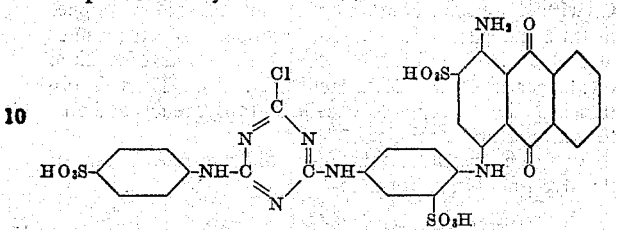

is dissolved in 50 parts of water, and the solution is stirred into 1175 parts of cellulose xanthate solution of 8.5% strength.

After allowing the mixture to stand for 60 hours at 20° C., it is extracted through spinning jets, and coagulated at 45° C. in a precipitation bath containing, per liter, 120 grams of sulfuric acid of 96% strength, 270 grams of sodium sulfate and 10 grams of zinc sulfate.

The resulting filaments are stretched to the extent of 25% and collected in a spinning can rotating at 6000 revolutions per minute.

The spinning cake so obtained is rinsed for 30 minutes in water at 70° C., then treated with a solution containing 5 grams of sodium carbonate per liter for 20 minutes at 70° C., again rinsed, and finally scrooped for 10 minutes at 50° C. with a solution containing 50 grams of sodium oleate per liter. The spinning cake is then dewatered and dried. The material has a transparent greenish blue dyeing which is very fast to washing and rubbing.

By using, instead of the aforesaid dyestuff, 2 parts of the dyestuff of the formula

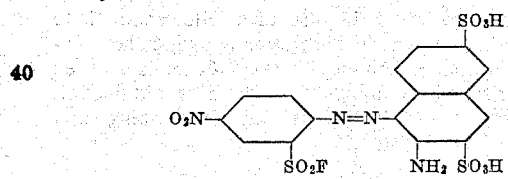

and otherwise proceeding in the manner described above, there is obtained a violet dyeing of good fastness to washing and rubbing.

By using, instead of the aforesaid dyestuff, 2 parts of the dyestuff of the formula

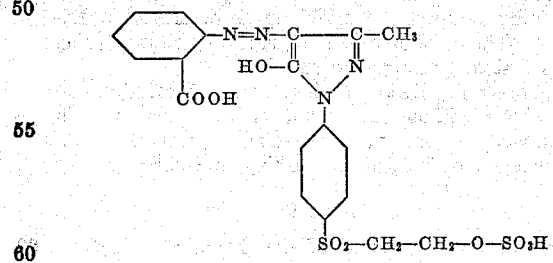

and otherwise proceeding in the manner described above, there is obtained a brilliant yellow dyeing having excellent properties of fastness.

Example 6

1 part of the dyestuff of the formula

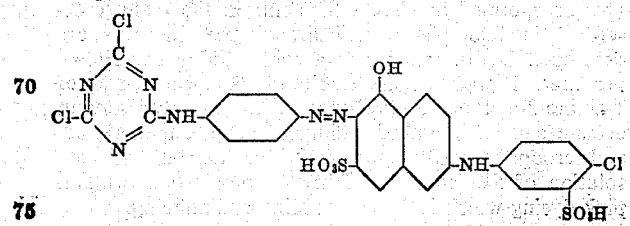

is dissolved in 50 parts of water and the solution is incorporated in viscose filaments produced as described in Example 5.

The viscose spinning cake so obtained, after being desulfured and rinsed, is after-treated for ½ hour at 70° C. with a solution containing 1 gram of sodium copper tartrate per liter, then rinsed, scrooped for 10 minutes at 50° C. in a solution containing 50 grams of sodium oleate per liter, and dewatered and dried. There is obtained a violet dyeing of excellent transparency and fast to washing and rubbing.

By using, instead of the aforesaid dyestuff, 1 part of the dyestuff of the formula

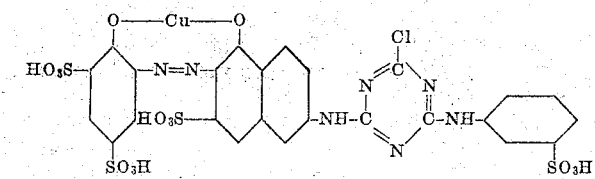

and otherwise proceeding in the manner described above, there is obtained a bright Bordeaux dyeing having similarly excellent properties of fastness.

Example 7

2 parts of the dyestuff of the formula

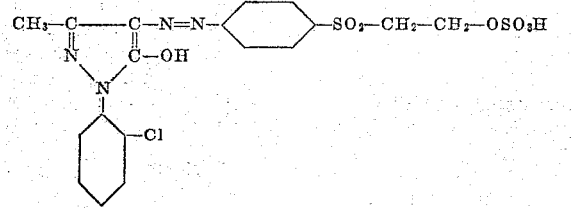

are stirred directly into 1175 parts of a cellulose xanthate solution of 8.5% strength, and, after allowing the solution to stand for 20 minutes at 0–5° C., it is worked up as described in Example 5. There is obtained a strong yellow dyeing which is fast to washing and rubbing.

Example 8

10 parts of the second dyestuff mentioned in Example 3 are stirred into 1175 parts of a cellulose xanthate solution of 8.5% strength. After being allowed to stand for 100 hours at 0–5° C., the mixture is mixed with the undyed cellulose xanthate solution in the ratio 1:4, and the resulting solution is worked up as described in Example 3. There is obtained a greenish yellow dyeing which is fast to washing and rubbing.

By spinning the dyed cellulose xanthate solution described above without diluting it, there is obtained an extraordinarily strong yellow dyeing of equally good transparency and fastness to washing and rubbing.

Example 9

2 parts of the compound of the formula

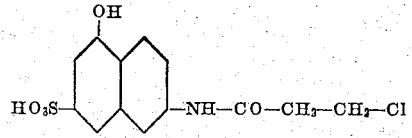

are incorporated in viscose filaments in the manner described in Example 1, and the viscose filaments are developed for 10 minutes in a cold solution containing, per liter, 1 gram of the stabilized diazo-compound of 1-amino-2-methoxy-5-nitrobenzene, 10 grams of sodium acetate and 0.5 gram of sodium carbonate, then rinsed, and scrooped for 10 minutes at 50° C. in a sodium oleate solution of 5% strength. There is obtained a brilliant pink dyeing which is fast to washing and rubbing.

By using 2 parts of the compound of the formula

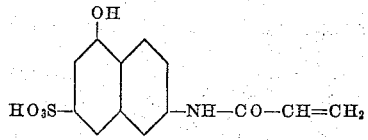

and otherwise proceeding in the manner described above, a similarly good result is obtained.

By using 2 parts of the compound of the formula

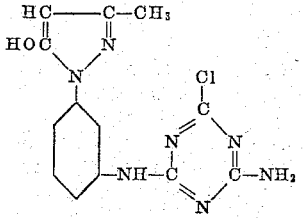

and proceeding in the same manner, there is obtained a transparent golden yellow dyeing which is fast to washing.

Example 10

32 parts of the dyestuff of the formula

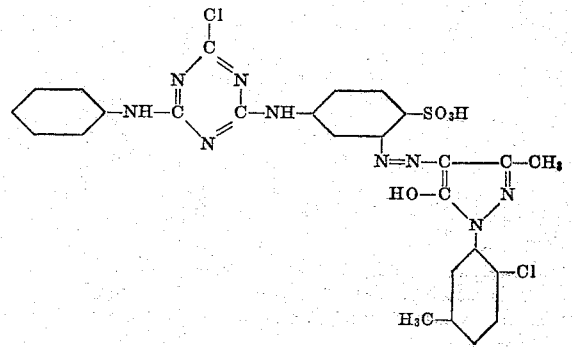

are dispersed by grinding with 90 parts of a solution of 1% strength of the condensation product of 8 mols of ethylene oxide with 1 mol of para-tertiary-octyl-phenol. The dispersion is stirred into 1175 parts of cellulose xanthate solution of 8.5% strength, and the whole is allowed to stand for 24 hours at 0–5 C.

The resulting mass, of which the viscosity is too high for it to be spun as such, is then mixed with the undyed cellulose xanthate solution in the ratio 1:16, and the mixture is worked up as described in Example 5. There is obtained a yellow dyeing which is fast to light and washing.

By dissolving 2 parts of the dyestuff of the above formula in 20 parts of a sodium hydroxide solution of 1% strength, and adding the solution to 1175 parts of the cellulose xanthate solution, and spinning the solution after allowing it to stand for 24 hours at 0–5° C., a similar result is obtained.

Example 11

2 parts of the dyestuff of the formula

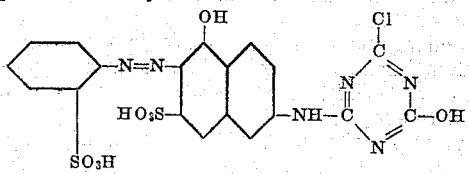

are dispersed in a solution of 10% strength of the condensation product of 8 mols of ethylene oxide with 1 mol of para-tertiary octyl-phenol, and the dispersion is stirred into 1175 parts of a cellulose xanthate solution of 8.5% strength. After allowing the mixture to stand for 24 hours at 0–5° C., the mixture is worked up as described in Example 5. There is obtained an orange colored viscose artificial silk which is fast to washing and light and has an excellent transparency.

Similarly good results are obtained with the following dyestuffs:

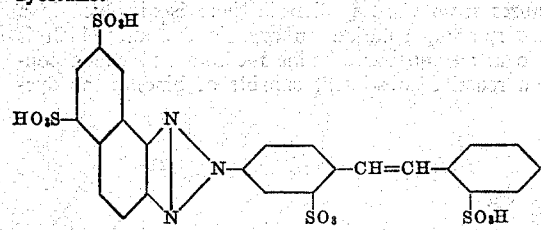

Tint: orange.

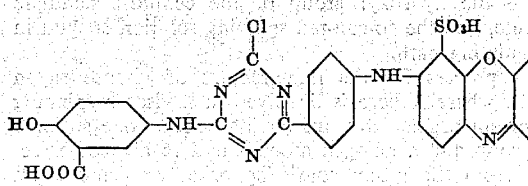

Tint: blue.

The condensation product obtained by reacting 1 mol of copper phthalocyanine tetrasulfochloride with 1-2 mols of the condensation product of the formula

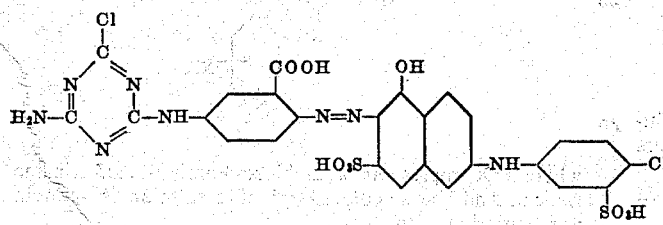

followed by hydrolysis of the unreacted sulfochloride groups to sulfonic acid groups. Tint: turquoise blue.

*Example 12*

2 parts of the dyestuff of the formula

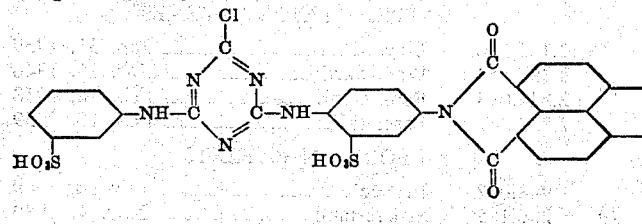

are dispersed in the manner described in Example 11, and the dispersion is stirred into a viscose solution. After allowing the mass to stand for one hour at 0–5° C., it is worked up as described in Example 5, whereby an orange colored viscose artificial silk which is fast to light and washing is obtained.

A strong red dyeing is obtained with 2 parts of the dyestuff of the formula

*Example 13*

2 parts of the dyestuff of the formula are dissolved in 50 parts by volume of warm water at about 50° C. with the addition of 2 parts of a 10 N-solu-

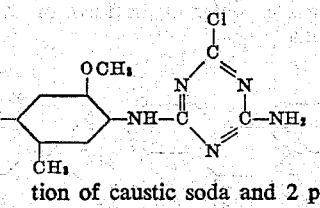

tion of caustic soda and 2 parts of sodium hydrosulfite.

The solution is stirred into 1175 parts of a cellulose xanthate solution of 8.5% strength, and the whole is allowed to stand at room temperature for 12 hours. The mixture is then worked up as described in Example 5. There is obtained a bluish red dyeing having excellent properties of fastness and of good brilliance.

By using, instead of the aforesaid dyestuff, 2 parts of the dyestuff of the formula

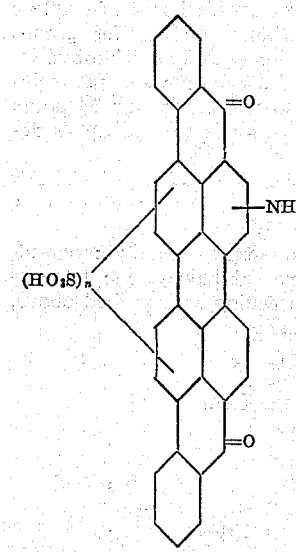

in which $n=2$, in the manner described above, there is obtained a transparent currant dyeing likewise having excellent properties of fastness.

The dyestuff of the formula first given above can be prepared as follows: 39 parts of the condensation product of perylene tetracarboxylic anhydride with 1:4-diaminobenzene-2-sulfonic acid in the molecular ratio 1:2 are dissolved in 1000 parts of water in the form of the disodium salt of the formula

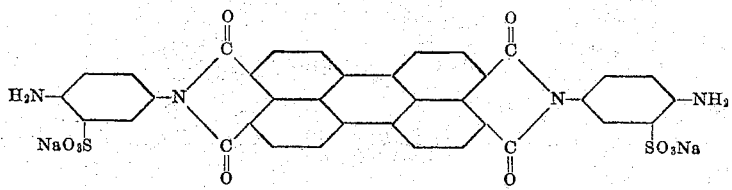

and to the solution is added a solution, heated at about 40° C. of 34.3 parts of 2:4-dichloro-6-phenylamino-triazine-3'-sulfonic acid in the form of its sodium salt in 500 parts of water. The temperature of the reaction mixture is maintained between 40° C. and 50° C., while stirring, and the hydrochloric acid liberated is neutralized by the gradual addition of a total of 55 parts by volume of a 2 N-solution of sodium carbonate in such manner that the pH value is maintained between 5.0 and 7.0. The new dyestuff is salted out from the dark red solution with a quantity of sodium chloride such that the solution contains 20% by volume of salt, the dyestuff precipitating in an easily filtrable form.

*Example 14*

2 parts of the dyestuff, obtained by reacting copper phthalocyanine tetrasulfochloride with 1 mol of ethylene diamine, hydrolyzing the residual sulfochloride groups and condensing the product with 1 mol of epichlorhydrin, are stirred into 1175 parts of a cellulose xanthate solution of 8.5% strength, and, after standing for 24 hours at room temperature, the mixture is worked up as described in Example 5.

There is obtained a turquoise blue viscose artificial silk which is completely transparent and has a good fastness to washing and light.

By using 2 parts of the mono-N:β-chlorethyl-monosulfonamide derivative of copper phthalocyanine tetrasulfonic acid and otherwise proceeding as described above, a similarly good result is obtained.

*Example 15*

2 parts of the dyestuff of the formula

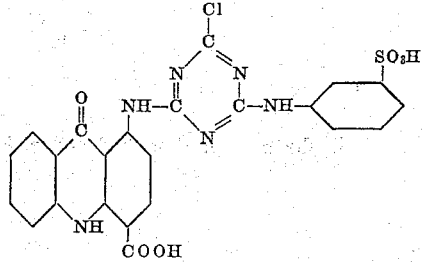

are stirred into 1175 parts of a cellulose xanthate solution of 8.5% strength, and, after standing for 12 hours at 0-5° C., the mixture is worked up as described in Example 5. There is obtained viscose artificial silk dyed a fast greenish yellow tint.

By using 2 parts of the 1:2-chromium complex of the dyestuff of the formula

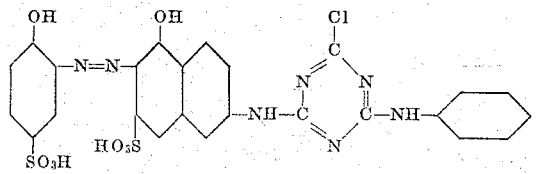

and otherwise working in the manner described above, a viscose artificial silk dyed a currant tint is obtained.

What is claimed is:
1. A process for the manufacture of colored shaped structures from viscose, wherein there is dissolved in a viscose spinning solution an organic dyestuff which is soluble in an aqueous alkaline medium and which contains a reactive substituent capable of binding the dyestuff to the hydroxyl group of the cellulose xanthate molecule, and the so-colored spinning solution is spun in a coagulating bath.

2. A process for the manufacture of viscose rayon threads, wherein there is dissolved in a viscose spinning solution an organic dyestuff having at least one sulfonic acid group and a halogen atom bound to a member selected from the group consisting of an aliphatic chain of at most 3 carbon atoms and a heterocyclic six-membered nucleus, and the so-colored spinning solution is spun in a coagulating bath.

3. A process for the manufacture of viscose rayon threads, wherein there is dissolved in a viscose spinning solution a member selected from the group consisting of an anthraquinone and an azo dyestuff having a sulfonic acid group and a chlorinated 1:3:5-triazine radical, and the so-colored spinning solution is spun in a coagulating bath.

4. A process for the manufacture of viscose rayon threads, wherein there is dissolved in a viscose spinning solution a monoazo dyestuff containing a sulfonic acid group and a monochloro-1:3:5-triazine radical, and the so-colored spinning solution is spun in a coagulating bath.

5. A process for the manufacture of viscose rayon threads, wherein there is dissolved in a viscose spinning solution a monoazo dyestuff containing a sulfonic acid group and a 2-chloro-4-amino-1:3:5-triazine radical, of which the amino group contains at most 7 carbon atoms, and the so-colored spinning solution is spun in a coagulating bath.

6. A process for the manufacture of viscose rayon threads, wherein there is dissolved in a viscose spinning solution an anthraquinone dyestuff which in its free acid state corresponds to the formula

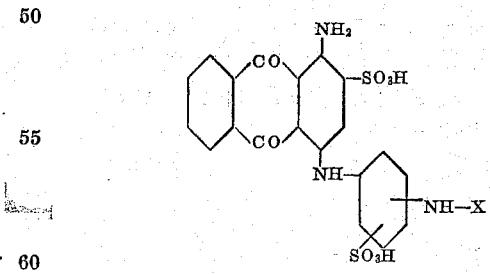

wherein X represents a 2-chloro-4-amino-1:3:5-triazine radical, and the so-colored spinning solution is spun in a coagulating bath.

References Cited in the file of this patent
UNITED STATES PATENTS

| | | |
|---|---|---|
| 2,145,580 | Bley | Jan. 31, 1939 |
| 2,397,454 | Woodward | Mar. 26, 1946 |
| 2,824,093 | Benz et al. | Feb. 18, 1958 |
| 2,873,269 | Fasciati | Feb. 10, 1959 |

FOREIGN PATENTS

| | | |
|---|---|---|
| 948,007 | France | July 20, 1949 |
| 206,185 | Switzerland | Nov. 1, 1939 |

UNITED STATES PATENT OFFICE
CERTIFICATE OF CORRECTION

Patent No. 2,927,035            March 1, 1960

Jacques Wegmann et al.

It is hereby certified that error appears in the printed specification of the above numbered patent requiring correction and that the said Letters Patent should read as corrected below.

Column 5, lines 67 to 73, the right-hand portion of the formula should appear as shown below instead of as in the patent:

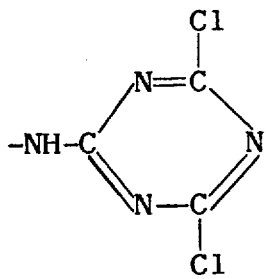

column 9, lines 10 to 13, for that portion of the formula reading:

Signed and sealed this 4th day of October 1960.

(SEAL)
Attest:

KARL H. AXLINE
Attesting Officer

ROBERT C. WATSON
Commissioner of Patents